United States Patent [19]
O'Loughlin

[11] 3,716,798
[45] Feb. 13, 1973

[54] ANTICIPATORY CHARGING REGULATOR

[75] Inventor: James P. O'Loughlin, Chelmsford, Mass.

[73] Assignee: Raytheon Company, Lexington, Mass.

[22] Filed: Feb. 25, 1972

[21] Appl. No.: 229,375

[52] U.S. Cl. ................... 328/67, 307/252 J, 307/268
[51] Int. Cl. ........................... H03k 1/02, H03k 1/12
[58] Field of Search ....328/65, 67; 307/252 H, 252 J, 307/252 W, 268

[56] References Cited

UNITED STATES PATENTS

| | | | |
|---|---|---|---|
| 2,596,142 | 5/1952 | Gerwin | 328/67 |
| 3,139,585 | 6/1964 | Ross et al. | 328/67 X |
| 3,363,184 | 1/1968 | Smith | 328/67 X |
| 3,473,049 | 10/1969 | Alexander | 328/67 X |

*Primary Examiner*—John Zazworsky
*Attorney*—Milton D. Bartlett et al.

[57] ABSTRACT

A regulator for resonant-charging circuits in which the state of the energy storage elements of the charging circuit, which includes the charging inductance and pulse-forming network, are measured as the circuit is charged and the charging is halted when the total energy in these elements is at a desired level.

13 Claims, 6 Drawing Figures

3,716,798

3,716,798

ANTICIPATORY CHARGING REGULATOR

BACKGROUND OF THE INVENTION

This invention relates generally to regulator systems and, more particularly, to full range energy conservative regulator systems for use with energy charging circuits of the resonant type such as those used to supply energy to thyratron or SCR pulse modulators.

In conventional radar transmitting systems utilizing magnetrons or other types of transmitting devices, it is necessary to supply excitation pulses for such magnetrons. One suitable means for doing this involves the use of a well-known line-type modulator wherein an inductor or charging coil supplies a voltage suitable to charge a pulse-forming network, PFN, operating in conjunction with a hydrogen-thyratron or solid-state discharge device to provide suitable pulses at a desired controllable voltage level. In order to maintain the magnetron peak-operating currents at specific values within tolerances of a few percent, such modulators must be provided with means for accurately regulating the voltage delivered to the load.

Conventional line-type modulators which have been used in an attempt to provide such regulation are subject to a number of disadvantages. For example, the output voltage of such resonant-charging regulators is directly proportioned to the DC power supply voltage, and therefore, to obtain an accurately adjusted or regulated output, an adjusted or regulated power supply of a generally expensive type, must be used. In addition, in the usual line-type modulator there is a build up time of several pulses required to get the resonant-charging circuit into a steady-state condition in which stable output voltages are reached. Thus, there is no capability of reaching the desired or normal output level with a single pulse or on a pulse-to-pulse basis; that is, when the system is first turned on, the pulse-forming network is charged only to the power source voltage, $E_{dc}$, whereas under normal steady-state resonant charging the pulse-forming network charges to approximately $2E_{dc}$. This conventional type of charging makes accurate regulation at the start of each cycle difficult, if not impossible, to achieve. Also, in many regulated power supplies using a series regulating switch in series with the charging winding of a reactor transformer the excess energy stored therein, for efficiency, is returned to the power source by means of a secondary winding on the reactor transformer coupled to the inductor winding and to unidirectional current means. A typical circuit of this type is described in detail in U.S. Pat. No. 3,127,573 issued Mar. 31, 1964 to T. A. Weil. This aforesaid energy return means is eliminated in the circuit of the invention because in the novel operation of the circuit, excess energy does not accumulate in the charging inductance. It is therefore an object of the invention to provide an improved power supply of the resonant-charging type which provides or reaches the full regulated output voltage even as early as the first pulse.

It is a further object of the invention to provide an improved charging circuit having highly accurate pulse-to-pulse amplitude regulation when such resonant-charging circuit is used in a line-type modulator. It is another object of the invention to provide a full range of nondissipative charging adjustment in which the output voltage can be adjusted to any value from zero voltage to the upper range capability of the charging circuit.

SUMMARY OF THE INVENTION

In accordance with the resonant-charging regulator of this invention, a series switching device is connected to a direct energy source in a manner to control the flow of charging current from the energy source into an energy-charging circuit which includes both the resonant-charging choke or inductor and the pulse-forming network and which, in turn, are connected to a load. A diode is connected across the input side of the choke and the side of the load opposite to the choke and poled to permit current through the choke to remain substantially continuous when the series switching device is open or nonconducting. During the time when the circuit is charging, means are provided for sensing the energy in both the charging inductive element and in the capacitive elements of the pulse-forming network, summing the energy of both inductive and capacitive elements, and comparing the total summed energy with a preset desired reference level to provide a control signal which opens the series switching device and halts the flow of charging energy when this total energy is at the desired level. By measuring the energy of both the inductive and capacitive elements of the charging circuit in this novel manner, the voltage amplitude to which the pulse-forming network can become charged is anticipated prior to its final steady-state condition and thus this voltage amplitude can be more conveniently and efficiently regulated than heretofore. By providing accurate cut off of the energy source at any anticipated level, a full range of charging voltage adjustment is achieved. Also, since the energy build up in the charging inductance does not become greater than the amount of energy actually required to reach the preset level, there is no excess energy remaining in the charging inductance requiring the use of extra components for return of such excess energy to the source.

In its broader aspects the invention contemplates connecting a switching device so that charging current flows from a DC energy source into a charging inductor and a load including a pulse-forming network. A freewheeling diode is connected across the input side of the inductor and the side of the load opposite to the inductor to permit continuous flow of current through the inductor when the switching device is opened. A control device is provided to control the switching operation of the switching device so that charging current is disconnected at the correct time when the desired total energy of the charging inductor and the pulse-forming network is reached. The point at which the switching device is opened depends upon the amount of energy measured in both the charging inductor and in the pulse-forming network.

BRIEF DESCRIPTION OF THE DRAWINGS

For a better understanding of the present invention, together with other and further objects thereof, reference is made to the following description taken in connection with the accompanying drawings, in which.

DESCRIPTION OF THE PREFERRED EMBODIMENT

Figure 2:
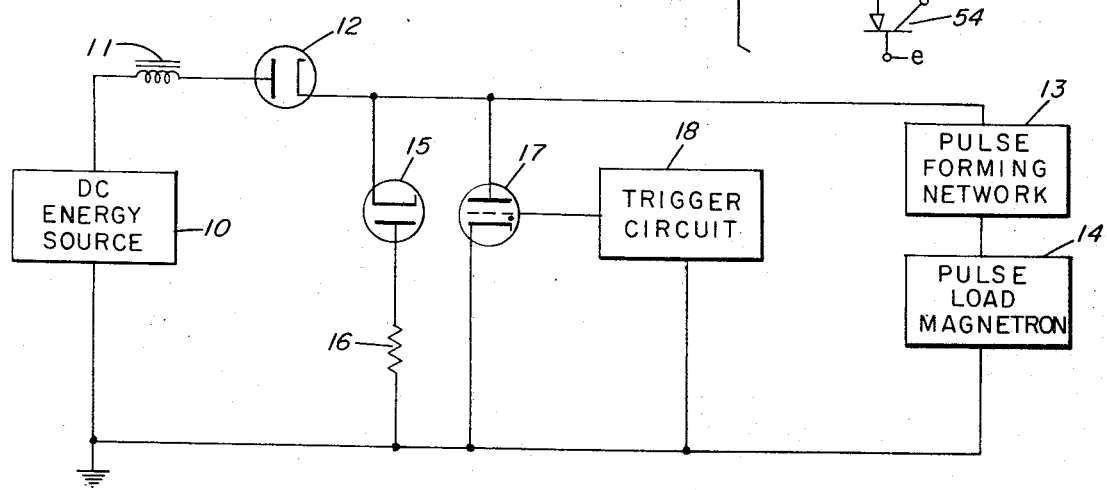
FIG. 2 shows a prior art charging regulator utilizing a series diode between the charging inductance and the pulse-forming network.

A conventional thyratron pulse modulator as shown in the prior art of FIG. 2 utilizes a direct or DC energy source 10, one side of which is connected to a reference ground point and the other side of which is connected to one end of a charging inductor or choke 11. The other end of the choke 11 is connected to the anode of a diode 12, the cathode of which is connected to one side of a conventional pulse-forming network 13. Pulse-forming network 13 is connected to and may be considered as part of a pulse load 14 which may be, for example, a pulse transformer and a magnetron type of radar-transmitting tube or any pulse load. Shunted across the pulse-forming network and pulse load is a second diode 15, the cathode of which is connected to the cathode of diode 12 and the plate of which is connected to the reference ground through a resistor 16. A thyratron 17 is connected from the cathode of diode 12 to ground. The grid of thyratron 17 is connected to a conventional trigger circuit 18 which causes it to fire at predetermined points in time in accordance with well-known operation in circuits of this type.

Diode 12 is used to maintain the pulse-forming network voltage at its peak value after charging is complete until such time as the thyratron is fired. This operation is commonly called "hold-off" and diode 12 is conventionally referred to as the "hold-off" diode, the operation of which is also described in detail in the aforementioned patent. Diode 15 is used to insure that the pulse-forming network 13 is fully discharged soon after the thyratron is fired even though there is a mismatch between the impedance of the pulse load and the impedance of the pulse-forming network. This action insures that the peak-charging voltage of network 13 will not change with variations in pulse load impedance, such as magnetron sparking. However, this prior art circuit requires a build-up time of several pulses to get the resonant-charging circuit into a steady-state condition. Thus, there is no single pulse operation as is provided by the present invention and in the event the thyratron 17 or its SCR equivalent becomes a short circuit by failing to recover from conduction, the system becomes inoperative because it is not possible to remove the short circuit fault from the DC energy source. The above disadvantages of the conventional resonant-charging circuit of the prior art of FIG. 2 can be eliminated by means provided in the following description for regulating the amplitude of the voltage in the resonant-charging circuit on a pulse-to-pulse basis and for disconnecting the short circuit from the energy source.

Figure 1:
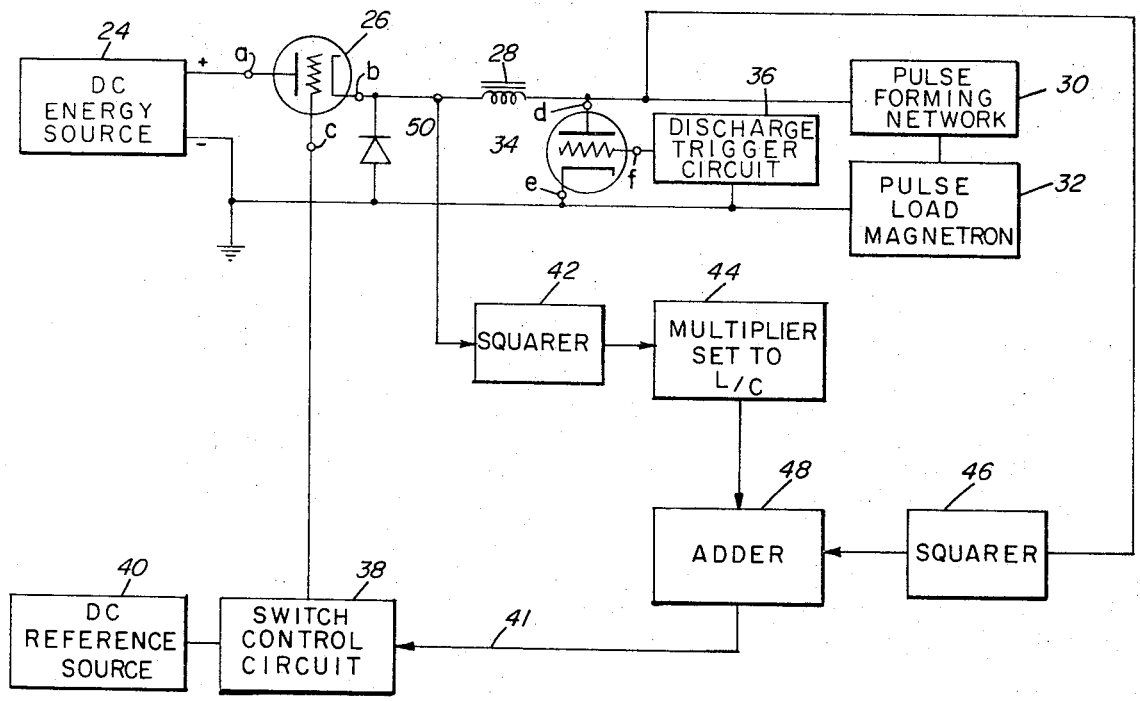
FIG. 1 shows a particular embodiment of the full range resonant-charging circuit of the invention.

Referring now to FIG. 1 there is shown a particular embodiment of the circuit of the invention. In that circuit, the charging current flowing from an energy source through an inductor or charging choke and to a pulse-forming network is cut off by a series switching device which is controlled by a signal developed by comparing with a fixed reference source the combined output signal obtained from sensing the current in the inductor and the voltage in the capacitive portion of the pulse-forming network. In particular, FIG. 1 shows a DC energy source 24 which has one side connected to a reference ground or common connection and the other side connected directly to a switching device herein shown as a series pass triode 26. The cathode of the triode 26 is connected to one end of a charging inductor 28. The other end of the charging inductor 28 is connected to an output circuit which, as disclosed in the aforesaid patent, includes a pulse-forming network 30 and a pulse load 32 such as used with a beacon device or, which may be, for example, a pulse transformer and a magnetron type of transmitting tube, as shown, or any other pulse load. To discharge the pulse-forming network, a thyratron 34 is connected from the common connection of the charging inductance and pulse-forming network to ground. The grid of thyratron 34 is connected to a conventional discharge trigger circuit 36 which causes the thyratron to fire at predetermined points in time according to well-known operation in circuits of this type.

In order to turn off at the desired charge level, the flow of energy from the DC source to the charging circuit, which includes the resonant-charging inductance and the pulse-forming network, a control signal is applied from switch control circuit 38 to the control grid of triode 26 whenever the input signal on line 41 fed into switch control circuit 38 exceeds the preset value of a conventional DC reference source 40 connected thereto. Control circuit 38 thus contains the conventional circuitry which compares the signal on line 41 with the DC reference voltage and provides a control signal which varies the voltage on the grid of triode 26 to turn off the triode series switch and thus regulate the peak-charging voltage to which the pulse-forming network 30 becomes charged in spite of voltage fluctuations of the DC energy source 24. However, to anticipate the energy which will be required by the pulse-forming network to become charged to the desired level, as preset in reference source 40, the circuit in a novel manner measures or senses the energy in both charging inductance 28 and pulse-forming network 30 and sums these values to provide the input voltage signal on line 41. This voltage signal is representative of the total energy in the charging inductance and in the pulse-forming network and is proportional to the square of the current in the charging inductance 28 multiplied by a constant and added to the square of the voltage on the capacitance of the pulse-forming network. To achieve this, a conventional voltage squaring device 42, which can include a simple tube circuit whose output signal is proportional to the square of its input signal, as disclosed at page 680, Vol. 19 of the MIT Radiation Laboratory Series published by Boston Technical Publishers, Inc., 1964, is connected to the input of charging inductance 28 by means of a conventional current-sensing resistor, not shown, in the input of the squaring device 42 and which converts the current sensed into a voltage signal for squaring. The output of the conventional squarer device 42 is connected to a well-known scaling multiplier which may include a voltage divider set to multiply according to the constant determined by the ratio of the inductance of the charging coil 28 divided by the capacitance of the pulse-forming network. The output of multiplier 44 represents the energy in the charging inductance which will be added to the energy already in the pulse-forming network assuming the series switch is opened at that particular time.

For determining the present energy in the pulse-forming network 30, a conventional squarer device 46 as described in the above reference is connected to sense the voltage on the pulse-forming network prior to addition of the energy from the charging inductance. The signal at the output of squarer 46 thus is a voltage proportional to the capacitive energy in the pulse-forming network. The outputs of multiplier 44 and squarer 46 are summed in a conventional adder circuit 48, as described at page 42, Vol. 21 of the MIT Radiation Laboratory Series published by Boston Technical Publishers, Inc., 1964, the output of which is a voltage signal $V_N(t)$ on line 41 which is proportional to the total energy in the charging circuit, that is, of the charging inductance 28 and pulse-forming network 30. This voltage signal on line 41 is then fed to the conventional switch control device 38 which compares the voltage signal on line 41 with the voltage output of reference source 40 which has been preset to the level at which it is desired to operate the charging network. When the signal on line 41 exceeds the reference signal 40, the negative bias voltage applied to the grid of the series pass triode 26 is increased in order to cut off any additional energy from accumulating in the charging inductance. When triode 26 is opened or cut off, energy in the charging inductor 28 flows through the pulse-forming network by way of a conventional free-wheeling diode 50 which is poled to conduct when triode 26 is cut off and thereby maintains continuous current flow in charging inductor 28 and prevents an excessive voltage transient across the inductor.

Figure 3:
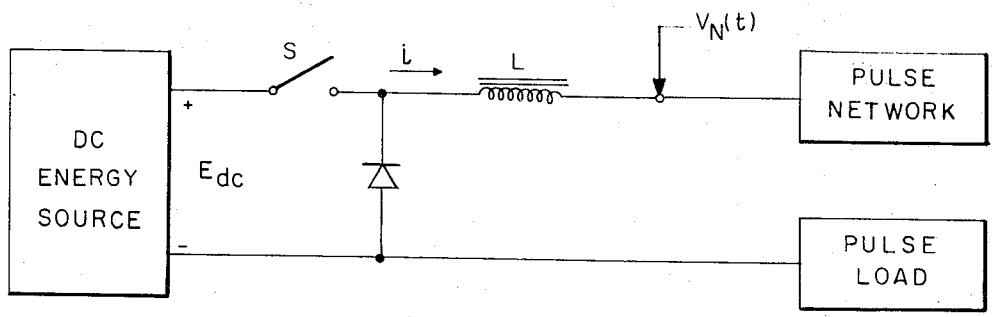
FIG. 3 shows a simplified circuit diagram arranged in a manner to aid in a description of the operation of FIG. 1.
Figure 4:
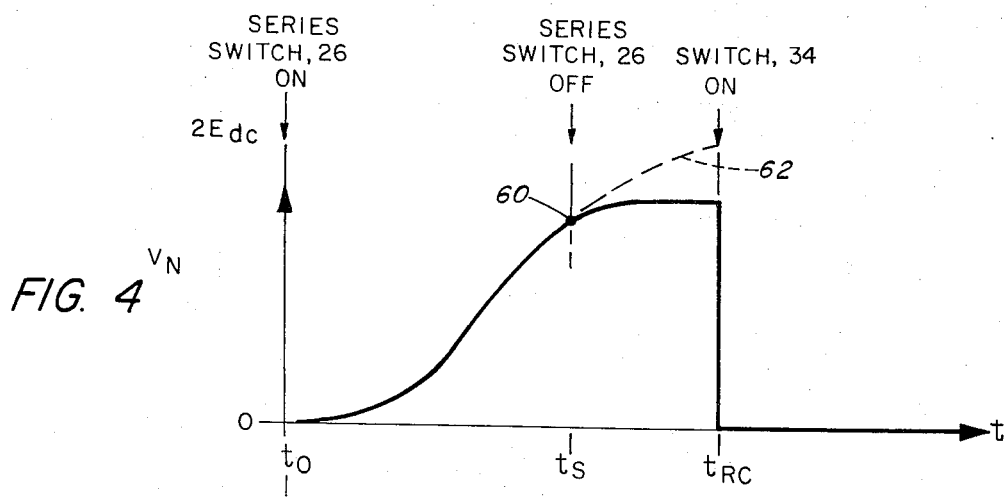
FIG. 4 shows the voltage waveform at the junction of the pulse-forming network and the charging inductor of FIG. 1.

In order to facilitate the explanation of operation of the system, FIG. 3 shows a portion of the elements of FIG. 1. If the pulse-forming network, PFN, of FIG. 4 is initially discharged ($V_N(0)=0$) when the switch S is closed, as determined by a conventional repetition rate timer, not shown, and if the charging cycle is permitted to go to completion, the pulse-forming network will charge to $V_N(t_{RC})=(2-\pi/4Q)$ Edc, where $Q$ equals circuit Q at $w=1/\sqrt{LC}$, where $t_{RC}=\pi\sqrt{LC}$, L equals the charging inductance, C equals the PFN capacitance, and w equals the resonant-charging frequency times $2\pi$.

If however, the switch S is opened at some time $t_S$ prior to $t_{RC}=\pi\sqrt{LC}$, the voltage to which the PFN will charge will be less than $V_N(t_{RC})$. If we denote the time at which the switch is opened as $t_S$ we can express the ultimate PFN voltage as:

$$V^2 = V_N^2(t_S) + i^2(t_S)L/C \text{ where:}$$

V = the ultimate PFN voltage if the switch is opened at $t_S$; $V_N(t_S)$ equals the actual PFN voltage at $t = t_S$, and $i(t_S)$ equals current flowing into the charging inductor L at $t = t_S$.

Now since L and C are both known for any given application, and $V_N(t)$ and $i(t)$ are observable from the circuit, it is possible to provide a running estimate of $V$ or $V^2$ in real time. Thus a control loop can be used to threshold at the proper time ($t_S$) to give a predetermined ultimate PFN voltage. The circuit permits the presetting of the desired pulse-forming network voltage as a reference $V_R^2$ and the control circuit insures that the pulse-forming network charges up to the selected value $V_R$ regardless of power source variations. It should be recognized that this arrangement is nondissipative since only lossless elements are used and that in this novel anticipatory charging circuit the switch S is opened at a time when the total energy in both the L anc C elements together is precisely the amount ultimately desired in the PFN capacitor.

Figure 5:
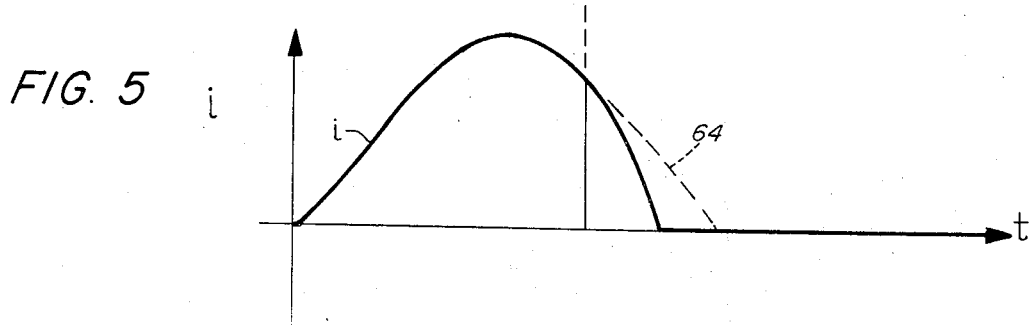
FIG. 5 shows the current waveform through the charging inductance.

Referring now to FIGS. 4 and 5 and in particular to FIG. 4, which shows the voltage waveform $V_N$ at the input to the pulse-forming network 30 which is initially discharged at time $t_0$. Operation is started at time $t_0$ by turning on series switch 26 and thus connecting the continuously operating source of energy to the charging circuit in which resonant charging proceeds in a well-known manner until time $t_S$ at which the total energy in the inductor 28 and the pulse-forming network 30 have reached the predetermined value selected by a voltage adjustment device, now shown, in reference source 40. Also, at time $t_S$, the series switch 26 is turned off and the voltage on the pulse-forming network continues to increase from point 60, however, at a slower rate and to a lesser value than if the series switch had not been turned off. For example, the dotted line 62 represents the value to which the pulse-forming network would have charged, which is approximately $2E_{DC}$ in the event the series switch 26 had not been opened in anticipation of achieving the desired predetermined voltage at time $t_{RC}$. When series switch 26 turns off at time $t_S$, the voltage build up on the pulse-forming network after time $t_S$ is a result of the transfer of stored energy in the inductor 28 into the pulse-forming network 30. The predetermined value of the voltage $V_N$ on the pulse-forming network, which is the value selected by the reference source, is reached by time $t_{RC}$. Also, at time $t_{RC}$ the discharge tube 34 fires to discharge the pulse-forming network into the load 32 and return the pulse-forming network voltage to zero.

FIG. 5 shows the current waveform i through the charging inductor 28. The waveform is typical of a conventional resonant-charging circuit until time $t_S$ at which time the series switch 26 opens and energy ceases to flow from the DC energy source 24. The current i in the inductor 28 is maintained continuous by the conventional operation of the free-wheeling diode 50 which becomes conductive. This current after time $t_S$ decreases to zero in a manner more rapidly than had the series switch not been opened in anticipation of achieving the preselected voltage level at time $t_{RC}$ of FIG. 4. The dotted line 64 of FIG. 5 indicates the current waveform i continuing in a conventional manner which would be as though the series switch 26 had not turned off at time $t_S$ in anticipation of reaching the desired voltage $t_{RC}$ of FIG. 4. The difference between actual current of FIG. 4 and the value of the conventional current shown by dotted line 64 varies as the switching time $t_S$ becomes lesser or greater depending upon the variation in the DC energy source 24. At time $t_{RC}$ both the waveform of FIG. 4 and the current waveform of FIG. 5, upon reaching zero remains at zero until another charging cycle is initiated by the series switch 28 turning on again at a conventional fixed point in time corresponding to the repetition rate of the circuit.

Figure 1A:
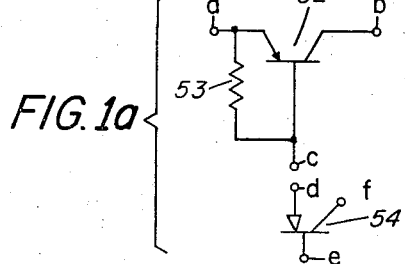
FIG. 1A shows an alternate embodiment of FIG. 1 using solid-state devices instead of tubes.

It should be understood that while the anticipatory charging circuit, as described, is a closed loop regulator, it is contemplated that the open loop operation of the circuit can be used as a simple means of adjusting the voltage on the pulse-forming network by opening the switch at predetermined adjustable intervals by a conventional timer, not shown. In this case, the sensing circuits are not used and only the diode 50 and the series switch 26 are used to transfer energy to the charging circuit. However, in either embodiment, it is possible to control the energy flow to the inductor to permit adjustment of the output voltage from zero upwards to approximately $2E_{DC}$. It should also be understood that the series switching device 26 can be removed at connection points $a, b, c$ and replaced with a solid-state element, such as transistor 52 of FIG. 1A including a conventional bias resistor 53. Also, the discharge device 34 can be replaced at nodes $d, e, f$, with a solid-state device, such as SCR 54, connected to discharge the pulse-forming network at preselected intervals according to well-known circuit practice. The invention thus describes a circuit in which there is no build up of excess energy to remain in the charging inductor at any time, thereby providing greater efficiency than heretofore and eliminating the need for more expensive power control alternatives such as variable auto transformers or a multiple winding charging inductor to return the excess or unused energy to the source.

While particular embodiments of the invention have been shown and described, various modifications thereof will be apparent to those skilled in the art and therefore it is not intended that the invention be limited to the disclosed embodiments or to details thereof and departures may be made therefrom within the spirit and scope of the invention as defined in the appended claims.

I claim:

1. A charging regulator circuit for supplying energy to an output circuit including a pulse-forming network, said regulator circuit comprising a source of direct energy, charging means including a charging inductance, switching means connected from said source of direct energy to said charging means for controlling the application of energy to said charging means, means for sensing the energy in said charging inductance and the energy in said pulse-forming network, means for providing a control signal proportional to the total energy sensed in said charging inductance and said pulse-forming network, and means for feeding said control signal to said switching means to cut off said switching means when said control signal exceeds a preset reference level.

2. A charging regulator circuit as set forth in claim 1 wherein said switching means is a semiconductor device, and an additional solid-state device is provided to discharge said capacitive pulse-forming network.

3. In combination:
   a load including a pulse-forming network;
   an inductor;
   an energy source;
   a switching device connected so current flows from said energy source through said switching device into said inductor and load;
   means for measuring the total energy in said inductor and said pulse-forming network to provide a control signal; and
   means for applying said control signal to said switching device in a manner adapted to cut off current from said energy source to said inductor when said total energy exceeds a predetermined amount.

4. A charging regulator circuit for supplying regulated energy to an output circuit, said regulator circuit comprising a source of direct energy, charging means including a charging inductance and a pulse-forming network connected to said output circuit, switching means connected from said source of direct energy to said charging means for controlling the application of said direct energy to said charging means, a free-wheeling diode connected from the junction of the switching means and charging inductance to the common side of the source of direct energy, means for sensing the current in said charging inductance and providing a first voltage signal proportional to the energy in said charging inductance, means for sensing the voltage on the pulse-forming network and providing a second voltage signal proportional to the energy in said pulse-forming network, means for summing said first and second voltage signals to provide a summed voltage signal proportional to the total energy in said charging means, means for comparing said summed voltage signal with a reference voltage signal to provide a control signal when said summed voltage signal exceeds said reference signal, and means for applying said control signal to said switching means to cut off said switching means at a time prior to transfer of the energy from the charging inductance through said diode into the pulse-forming network, whereby said pulse-forming network reaches the voltage level anticipated by both of said sensing means.

5. A charging regulator circuit for supplying energy to an output circuit including a pulse-forming network, said regulator circuit comprising a source of direct energy, charging means including a charging inductor, switching means connected from said source of direct energy to said charging means for controlling the application of said energy to said charging means, means for sensing the energy in said charging inductor and the energy in said pulse-forming network, means for providing a control signal proportional to the total energy sensed in said charging inductor and in said pulse-forming network, means for opening said switching means when said control signal exceeds a preset level, and means for providing for the transfer of said energy from said charging inductor to said pulse-forming network after said switching means has interrupted the flow of energy from said direct energy source.

6. A charging regulator as set forth in claim 5 wherein the means for providing for the transfer of energy from said charging inductor to said pulse-forming network is a free-wheeling diode connected from the input end of said charging inductor to the side of said source of direct energy opposite to the charging inductor.

7. A charging regulator circuit for supplying regulated energy to an output circuit, said regulator circuit comprising a source of direct energy, charging means including a charging inductance to provide a charging voltage for said output circuit, a switching device connected from said source of direct energy to said charging inductance for controlling the application of said direct energy to said output circuit, a pulse-forming network and a load included in said output circuit, voltage-sensing means connected to said output circuit for providing a first voltage proportional to the voltage in said pulse-forming network, current-sensing means connected to said charging inductance to provide a second voltage proportional to the current in said charging inductance, means for summing said first and second voltages to provide a signal proportional to the energy in said pulse-forming network and said inductance, and means in response to said latter signal for applying a control voltage to said switching means to regulate the amplitude of voltage on said pulse-forming network on a pulse-to-pulse basis.

8. A charging regulator circuit comprising a pulse load device including a pulse-forming network, a charging inductor, a source of direct energy, a switching device connected in a manner in which said direct energy flows through said switching device, said charging inductor and said load, means for transferring energy from said charging inductor to said pulse-forming network when said switching device is opened, and means for opening said switching device at a point when the flow of said energy into said charging inductor reaches a value at which the total energy of said charging inductor and pulse-forming network is equal to the amount of energy to be transferred to the pulse-forming network to provide a desired charge level, and means for measuring the total energy in said charging inductor and said pulse-forming network to provide a control signal to actuate said switch opening means at said desired charge level.

9. In combination:
a load including a pulse-forming network;
an inductor;
a source of direct energy;
a switching device connected so current flows from said direct energy source through said switching device into said inductor and load,
and means for applying a control signal to said switching device in a manner adapted to cut off current flowing from said direct source of energy to said inductor and load when said energy reaches a level ultimately required by said pulse-forming network to provide a desired charging level.

10. In combination:
a load including a pulse-forming network;
an inductor;
a source of direct energy;
a switching device connected so current flows from said direct energy source through said switching device into said inductor and load,
means for applying a control signal to said switching device in a manner adapted to cut off current flowing from said direct source of energy to said inductor and load when said energy reaches a level ultimately required by said pulse-forming network to provide a desired charging level; and
means for transferring said energy from said inductor to said pulse-forming network following cut off of said switching device.

11. A charging circuit including a pulse-forming network, an inductor, a direct energy source, a switching device connected so current flows from said energy source through said switching device into said inductor and pulse-forming network, means for providing a control signal proportional to the total energy in said inductor and pulse-forming network, means for opening said switching means when said control signal exceeds a preset signal proportional to the desired level to be reached by said pulse-forming network, and means for transferring energy from said inductor into said pulse-forming network after said switching device has been opened.

12. A charging regulator as set forth in claim 10 wherein said switching device is a transistor and said energy transferring means is a free-wheeling diode.

13. A charging regulator circuit for supplying energy to an output circuit including a pulse-forming network, said regulator circuit comprising a source of direct energy, charging means including a charging inductor, switching means connected from said source of direct energy to said charging means for controlling the application of said energy to said charging means, means for sensing current in said charging inductor, means connected to said current sensing means for providing a first squared output signal proportional to the square of the voltage represented by said sensed current, means for multiplying said squared output signal by a voltage representative of a constant proportional to the inductance of the charging coil divided by the capacitance of the pulse-forming network to provide a multiplied output voltage, means for sensing the voltage on said pulse-forming network, means for providing a second squared output signal proportional to the square of the voltage sensed, means for summing said first and second squared output signals to provide a voltage signal proportional to the energy of said charging inductor and said pulse-forming network, means for comparing said voltage signal with a preset reference voltage to provide a control signal to cut off said switching means when said control signal exceeds a preset reference level.

* * * * *